US010145117B2

(12) United States Patent
Bilbrey et al.

(10) Patent No.: US 10,145,117 B2
(45) Date of Patent: *Dec. 4, 2018

(54) SKYLIGHT WITH HIGH ANGLE SUNLIGHT SHADE DEVICE

(71) Applicants: Paul Joseph Bilbrey, Phoenix, AZ (US); Bruce Edward Bilbrey, Phoenix, AZ (US)

(72) Inventors: Paul Joseph Bilbrey, Phoenix, AZ (US); Bruce Edward Bilbrey, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,092

(22) Filed: Sep. 18, 2017

(65) Prior Publication Data
US 2018/0100308 A1    Apr. 12, 2018

Related U.S. Application Data

(63) Continuation-in-part of application No. 14/466,871, filed on Aug. 22, 2014, now Pat. No. 9,765,522.

(51) Int. Cl.
| | | |
|---|---|---|
| *E04D 13/03* | (2006.01) | |
| *E06B 9/24* | (2006.01) | |
| *H02S 20/23* | (2014.01) | |
| *H02S 20/26* | (2014.01) | |
| *G02B 5/00* | (2006.01) | |
| *G02B 5/20* | (2006.01) | |

(52) U.S. Cl.
CPC .......... *E04D 13/033* (2013.01); *G02B 5/003* (2013.01); *G02B 5/205* (2013.01); *H02S 20/23* (2014.12); *H02S 20/26* (2014.12); *E04D 13/03* (2013.01)

(58) Field of Classification Search
CPC ... E04D 13/0325; E04D 13/03; E04D 13/033; G02B 6/3582; G02B 6/4219; G02B 7/00; G02B 7/008; E06B 9/24
See application file for complete search history.

(56) References Cited

U.S. PATENT DOCUMENTS

| | | | | |
|---|---|---|---|---|
| 1,220,219 | A * | 3/1917 | Goldman | E04D 13/03 52/200 |
| 4,283,889 | A * | 8/1981 | Dunn | A01G 9/241 52/66 |
| 5,204,777 | A * | 4/1993 | Curshod | E04D 13/033 359/596 |
| 7,322,156 | B1 * | 1/2008 | Rillie | E04D 13/033 359/592 |
| 9,765,522 | B2 * | 9/2017 | Bilbrey | E04D 13/033 |
| 2007/0297058 | A1 * | 12/2007 | Briee | E04D 13/033 359/597 |
| 2008/0250735 | A1 * | 10/2008 | Patterson | E04D 13/033 52/200 |
| 2009/0211182 | A1 * | 8/2009 | Proisy | F24J 2/4614 52/173.3 |

\* cited by examiner

*Primary Examiner* — Phi D A
(74) *Attorney, Agent, or Firm* — Parsons & Goltry; Robert Parsons; Michael Goltry

(57) ABSTRACT

A skylight shade device and skylight mounted on a roof of a building includes a roof and a skylight installed on the roof. A shade element including photovoltaic cells is positioned to occlude at least a portion of high angle sunlight through the skylight dome without occluding low angle sunlight through the skylight dome.

11 Claims, 3 Drawing Sheets

SKYLIGHT WITH HIGH ANGLE SUNLIGHT SHADE DEVICE

CROSS-REFERENCE TO RELATED APPLICATIONS

The present application is a Continuation-in-Part of, and claims the benefit of U.S. patent application Ser. No. 14/466,871, filed 22 Aug. 2014.

FIELD OF THE INVENTION

This invention relates to skylights.

More particularly, the present invention relates to control of light through skylights.

BACKGROUND OF THE INVENTION

In the field of lighting, skylights are often employed to increase natural lighting in an enclosed space such as buildings. The use of natural lighting can be a low cost method of increasing light and reducing electricity costs. Roof mounted skylights produce more light than is required at high sun angles and therefore more heat from the excess sunlight. The excess solar heat gain negatively impacts the energy performance of the building and creates discomfort for the occupants.

Temporary shade screens above or below the skylight have been employed in an attempt to reduce this effect. While somewhat effective, shade screens would have to be installed and removed continuously throughout the year, or very costly mechanical devices would be needed, that could be operated to open and close the shade screens at certain times of the day. Other solutions are inconvenient and very costly.

It would be highly advantageous, therefore, to remedy the foregoing and other deficiencies inherent in the prior art.

An object of the present invention is to provide a shade device for skylights.

Another object of the present invention is to provide a shade device that does not require any daily or routine adjustments or maintenance.

Yet another object of the present invention is to provide a shade device for skylights that creates a daily "eclipse" effect, limiting or eliminating certain high sun angle light.

SUMMARY OF THE INVENTION

Briefly, to achieve the desired objects and advantages of the instant invention, provided is a skylight shade device and a skylight mounted on a roof of a building. The skylight installed on the roof includes a skylight dome entirely covering a skylight opening formed in the roof. The skylight dome is entirely transparent to sunlight and has an inner surface toward the roof defining an inside of the skylight dome and an outer surface away from the roof defining an outside of the skylight dome. A shade element including photovoltaic cells is positioned to occlude at least a portion of high angle sunlight through the skylight dome without occluding low angle sunlight through the skylight dome.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Roof mounted skylights are used for the purpose of illuminating the interior of a building with sunlight. Most common skylights capture sunlight and direct the light into a building from sunrise to sunset. Light levels introduced into the building vary from very low to very high, depending on the time of day or angle of the sun. In the morning, low angles of the sun, a skylight will produce very low light levels and in the mid-day hours the high sun angles will produce a very high level of light, too much light which also creates more heat in the area being lit by the skylight. Roof mounted skylights often produce more light than is required at high sun angles and therefore more heat from the excess sunlight. The excess solar heat gain negatively impacts the energy performance of a building and creates discomfort for the occupants.

Figure 1:
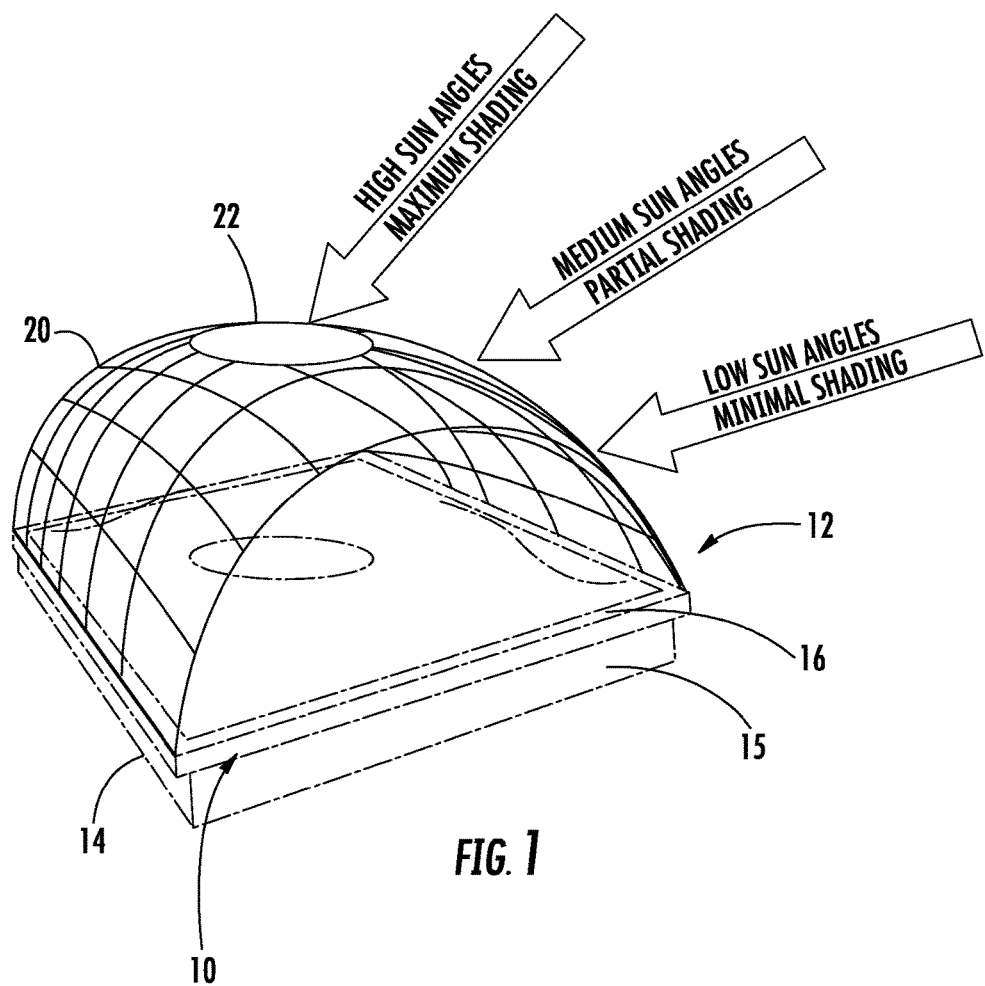
FIG. 1 is a perspective view of a shade device, including a security screen, mounted on a skylight according to the present invention.

Turning now to the drawings in which like reference characters indicate corresponding elements throughout the several views, attention is first directed to FIG. 1 which illustrate a skylight 10 having a high angle sunlight shading device 12 engaged therewith. Skylight 10 is carried by roof 14 and includes a frame 15 and a dome 16. It will be understood that various types, aperture sizes and shapes of skylights are available, and high angle sunlight shading device 12 can be utilized with these different skylights. Additionally, while skylight 10 is illustrated as including frame 15, it will be understood that other types of skylight do not have a frame. It will also be understood that while dome 16 is illustrated as having a domed shape, the present invention can also be used on skylights having a dome 16 that is flat and may be a single lens/dome or multiple lenses/dome.

Still referring to FIG. 1, shading device 12 includes a support structure 20 and a shade element 22 supported thereby. In this embodiment, support structure 20 is a wire mesh security screen, often required by code, to which shade element 22 is coupled. Shade element 22 is mounted above skylight dome 16 to block out a predetermined amount of solar energy, namely, occluding at least some high angle sunlight without occluding low angle sunlight. Shade element 22 can be of various shapes, sizes and materials, but has a surface area smaller than the surface area of skylight dome 16. Shade element 22 produces the effect of a Solar Eclipse by coming between the sun and skylight 10 as the solar angles get higher (increase). Shade element 22 will begin shading the amount of light that hits the skylight lens as the sun or solar angle increases, which will minimize the amount of solar gain in the higher solar angles. Shade element 22 will provide minimal or no shading during the lower sun or solar angles. Shade element 22 can be a perforated or solid metal form of circular, elliptical, square or other shapes, suspended above skylight dome 16 by support structure 20. Shade element 22 creates an "eclipse" effect to manage and reduce excess solar gain at prescribed higher sun angles. The management of the excess solar gain will enhance the comfort level and energy performance of the building. Shade element 22 will be a predetermined size and shape and will be mounted a predetermined height above the surface of skylight dome 16 to provide the maximum eclipse effect for that size and shape of skylight 10. While shade element 22 is preferably formed of metal, it can also be formed of a translucent or opaque acrylic, glass, or other material that reduce penetration of sunlight.

While in the preferred embodiment shade element 22 is carried by and positioned above dome 16 by support structure 20 which is a mesh security screen, support structure 20 can take other forms, such as metal arm supports or brackets that are fastened to skylight frame 15. In this case, shade element 22 is suspended above the surface of the skylight dome and supported by metal arm supports that are fastened to skylight frame 15.

Figure 2:
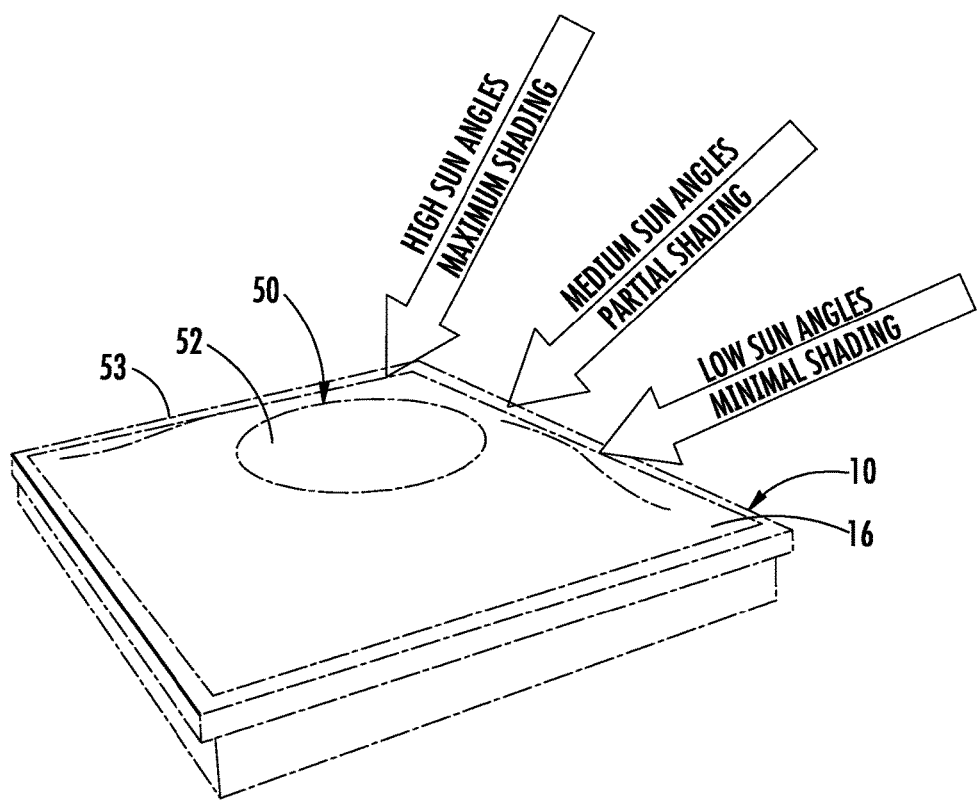
FIG. 2 is a perspective view of shade device mounted on a skylight according to the present invention.

Turning now to FIG. 2, another embodiment of a high angle sunlight shading device, generally designated 50 is illustrated. Device 50 includes a shade element 52 carried by a support element 53, which in this embodiment is dome 16 of skylight 10. Shade element 52 is coupled to dome 16 in a number of possible methods, such as by adhesive to an inner surface or an outer surface. Shade element 52 can also be formed within dome 16 during fabrication. In all of these instances, shade element 52 is positioned generally centrally of skylight dome 16. Shade element 52 can be applied to dome 16 as a fixed body attached to dome 16, or as a material applied to the surface spray with a or brush application. Thus, shade element 52 can be, for example, metal, a tinted or dark acrylic or glass, a dark or black paint or coating, and the like.

Shade element 22 whether applied to the surface of skylight dome 16 or suspended above skylight dome 16 by support structure 20 will create an "eclipse" effect that will provide positive shading of the skylight dome surface during high sun angle portions of the day. Each embodiment described will allow full sun penetration into skylight 10 at certain lower sun angle periods but will increasingly block excess sunlight from penetrating skylight dome 16 during predetermined high sun angle periods of the day. The eclipse effect is vital to managing the solar gain and resulting solar heat produced by skylights at high sun angle periods. The various materials and embodiments will produce a like effect and will allow for conditions where a security screens is required by safety or building code standards and for conditions where no safety screens is required.

Device 12 provides a daily eclipse effect without any adjustments or mechanical means to alleviate excess light and heat during high sun angle periods, and can be applied to new or existing skylights that are manufactured of various material(s) such as fiberglass, glass, poly vinyl chloride, acrylic, polycarbonate, or other material(s) commonly found in the skylight industry. High angle sunlight shading device 12 will provide the same effect on skylight surfaces having flat or dome shapes. With precisely engineered shade elements creating a daily "eclipse" effect certain high sun angle light will be limited or eliminated, while allowing lower sun angle light full entry into a building. Shade device 12 will be permanent and will not require any daily or routine adjustments or maintenance.

The materials used for shade element 22 are preferably developed and applied during the manufacturing process of the skylight products. The materials that would be suspended above the dome will be manufactured and fastened to the security screens or arm brackets during the manufacturing process. The material(s) applied directly to the skylight dome in a disc shape will be adhered to or applied to the inner or outer surface of the skylight dome during the manufacturing process of the skylight assembly. The hard form materials i.e. metal discs/ellipticals or other shapes and translucent or opaque acrylic discs/ellipticals or other shapes can be produced by the skylight manufacturer and applied to the skylight dome or the security screens during the manufacturing and assembly process. The material discs, ellipticals or other shapes that will be adhered directly to the inner or outer surface of the skylight dome can be applied to the surface with a spray or brush application during the assembly phase after the skylight dome is manufactured. The circular, elliptical or other shapes formed directly into the skylight dome will be formed during the manufacturing process.

All of the described elements are equally necessary as they address various conditions where skylights are specified for installation. Many skylight specifications require externally mounted security screens to be supplied with the skylight which then would require the eclipse disc to be applied as a part of the external screen. Many skylight specifications do not require externally fixed security screens and will therefor require the eclipsing disc to be directly applied to the surface of the skylight dome. As skylights have been in use for over 50 years and are heavily used in current construction a variety of methods and materials is required to meet the varied conditions and requirements.

All of the methods and materials could theoretically be interchanged to create the desired eclipse effect. For example a translucent acrylic disc could be fastened to an externally mounted security screen, or a solid metal or perforated metal disc could be adhered to the surface of the skylight dome. The need for the various materials is dictated by the ease and cost of manufacturing and installation.

Figure 3:
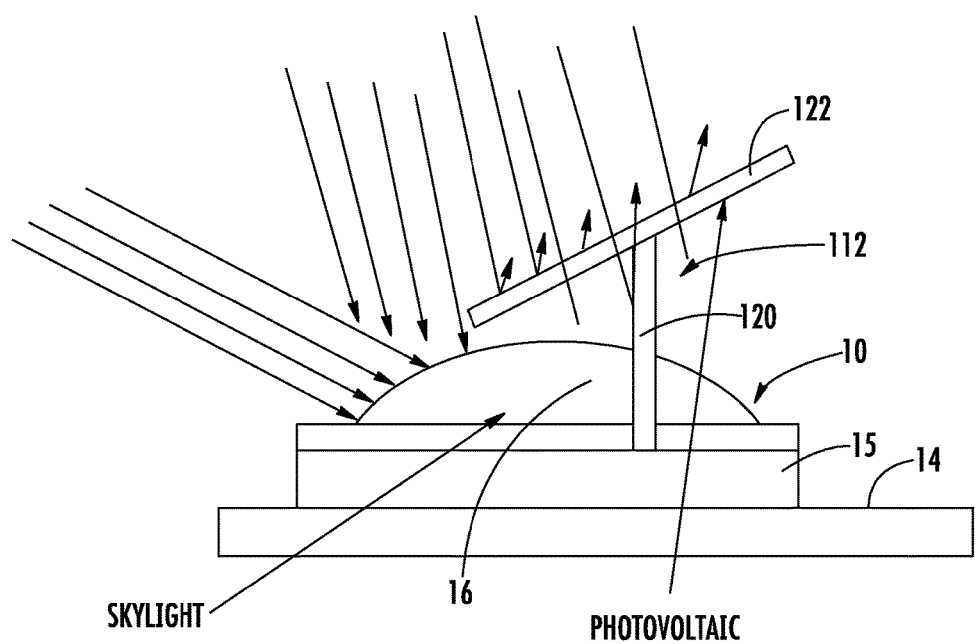
FIG. 3 is a perspective view of photovoltaic shade device mounted on a skylight according to the present invention.

Turning now to FIG. 3, another embodiment of a high angle sunlight shading device, generally designated 112, positioned on skylight 10, is illustrated. As in the previous embodiments, skylight 10 is carried by a roof 14 and includes a frame 15 and a dome 16. It will be understood that various types, aperture sizes and shapes of skylights are available, and high angle sunlight shading device 112 can be utilized with these different skylights. Additionally, while skylight 10 is illustrated as including frame 15, it will be understood that other types of skylight do not have a frame. It will also be understood that while dome 16 is illustrated as having a domed shape, the present invention can also be used on skylights having a dome 16 that is flat and may be a single lens/dome or multiple lenses/dome.

Still referring to FIG. 3, shading device 112 includes a support structure 120 and a shade element 122 supported thereby. In this embodiment, shade element 122 is preferably a solar panel. In this embodiment, support structure 120 is a bracket 124 which can be fabricated of material sufficiently rigid to support shade element 122. This material includes wood, metal, plastic and the like. Bracket 124 is coupled to frame 15 and extends upwardly, supporting shade element 122 above and overlying dome 16. In as specific example, shade element 122 is suspended above the surface of skylight dome 16 by metal arm supports (bracket 124) that are fastened to skylight frame 15. Shade element 122 is mounted above skylight dome 16 to block out a predetermined amount of solar energy, namely, occluding at least some high angle sunlight without occluding low angle sunlight. Shade element 122 in this embodiment consist of photovoltaic (PV) cells. Photovoltaic cells convert light (photons) into electricity (voltage). Shade element 122, including photovoltaic cells, can be of any shape such as but not limited to, oblong, rectangular, square, round etc. Photovoltaic cells can be panels in frames and mounted with brackets above the skylight or attached to the inside or outside of a skylight dome. Regardless of the mounting method, the PV array is mounted so that low sun angles are allowed to strike the skylight dome without any sun blockage and as the sun moves to higher angles, shade element 122 including photovoltaic cells will start blocking the sunlight and can be mounted flat or angled to the sun. Unlike a stand-alone PV system, shade element 122 having photovoltaic cells has a dual purpose. It provides shading on a skylight in high sun angles which reduces the solar heat gain caused by the excess light from the skylight and the photovoltaic cells generate electricity for the building usage or to be directed back into the existing power grid similar to a stand-alone PV system.

While a bracket 124, also referred to as upright supports, are employed in this specific embodiment, it will be understood that the wire mesh security screen as described with respect to FIG. 1 can also be used.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A skylight shade device and skylight mounted on a roof of a building comprising:
   a roof
   a skylight installed on the roof, the skylight having a skylight dome entirely covering a skylight opening formed in the roof, the skylight dome being entirely transparent to sunlight and having an inner surface toward the roof defining an inside of the skylight dome and an outer surface away from the roof defining an outside of the skylight dome; and
   a shade element positioned to occlude at least a portion of high angle sunlight through the skylight dome without occluding low angle sunlight through the skylight dome, the shade element including photovoltaic cells.

2. A skylight shade device and skylight mounted on a roof of a building as claimed in claim 1 wherein the shade element is smaller than the skylight dome.

3. A skylight shade device and skylight mounted on a roof of a building as claimed in claim 1 further comprising a support structure supporting and positioning the shade element above the skylight dome.

4. A skylight shade device and skylight mounted on a roof of a building as claimed in claim 3 wherein the support structure is a security screen mounted on the skylight.

5. A skylight shade device and skylight mounted on a roof of a building as claimed in claim 3 wherein the support structure includes the skylight dome.

6. A skylight shade device and skylight mounted on a roof of a building as claimed in claim 1 wherein the shade element produces an artificial eclipse of sunlight through the skylight dome.

7. A skylight shade device and skylight mounted on a roof of a building comprising:
   a roof;
   a skylight installed on the roof, the skylight having a skylight dome with a surface area, the skylight dome entirely covering a skylight opening formed in the roof, the skylight dome entirely transparent to sunlight; and
   a shade element including photovoltaic cells, the shade element having a surface area smaller than the surface area of the skylight dome and positioned generally centrally within the surface area of the skylight dome to prevent at least a portion of high angle sunlight from passing through the skylight dome without occluding low angle sunlight through the skylight dome.

8. A skylight shade device and skylight mounted on a roof of a building as claimed in claim 7 further comprising a support structure supporting and positioning the shade element above the skylight dome.

9. A skylight shade device as claimed in claim 8 wherein the support structure is a security screen mounted on the skylight.

10. A skylight shade device and skylight mounted on a roof of a building as claimed in claim 8 wherein the support structure includes the skylight dome.

11. A skylight shade device and skylight mounted on a roof of a building as claimed in claim 7 wherein the shade element produces an artificial eclipse of sunlight through the skylight dome.

* * * * *